May 10, 1960 E. B. CLARK 2,936,091
JUNCTION BOX WITH ADJUSTABLE LEVELING RING
Filed Sept. 30, 1957 2 Sheets-Sheet 2
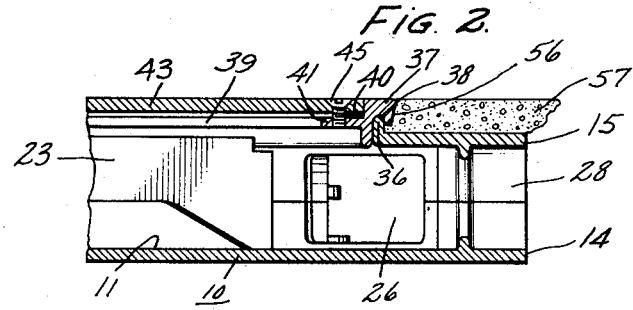
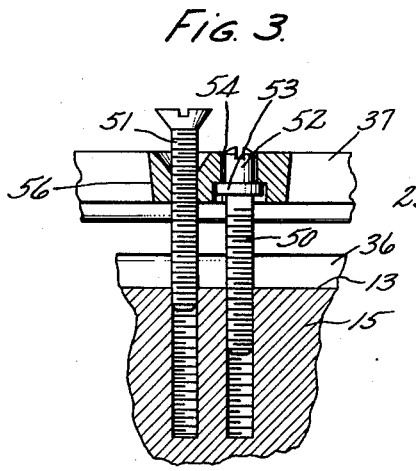
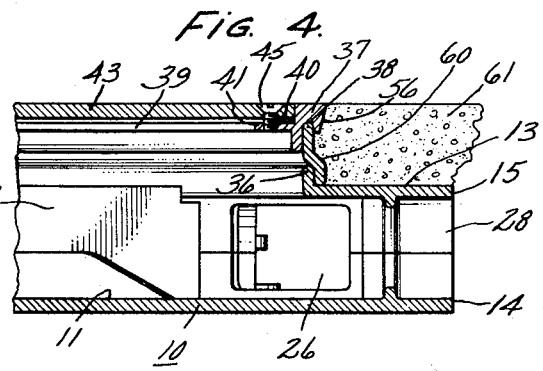
Inventor:
Edward B. Clark.
by Richard L Caslin
Allard A. Braddock
His Attorneys

United States Patent Office 2,936,091
Patented May 10, 1960

2,936,091

JUNCTION BOX WITH ADJUSTABLE LEVELING RING

Edward B. Clark, Milford, Conn., assignor to General Electric Company, a corporation of New York Application September 30, 1957, Serial No. 687,323

2 Claims. (Cl. 220—3.4)

This invention relates to an underfloor wiring distribution system and particularly to a junction box for use in such a system.

An underfloor wiring distribution system is commonly found in large stores and office buildings having concrete floor constructions where it is necessary to wire both the floors and the walls to provide such electrical services as lighting, power and communication. Panel boxes are mounted in the walls at each floor level of the building and feeder ducts are used to connect the panel boxes with the junction boxes that are embedded in the concrete floor. Either steel or non-corrodible fiber ducts or raceways are assembled between the junction boxes to form an underfloor network into which the necessary wires may be pulled. Cylindrical inserts are located along the top surface of the ducts at spaced intervals so that the wires may be brought out of the floor and connected with a floor outlet, telephone box or similar device.

A junction box for an underfloor system is a heavy iron casting with an access opening in its top wall through which the wires are added to the system and the electrical connections made between the related circuits. In the past, vertically adjustable leveling rings have been installed over the access opening of each junction box so that if an excess of concrete fill were poured, it would be possible to raise the leveling ring to the level of the concrete. Then a floor cover plate fastened within the leveling ring would close the access opening of the box and be flush with the top surface of the concrete floor.

A serious problem exists in the present designs of leveling rings if the concrete fill is excessive and it hardens before the ring is raised. Once the concrete has set, it has been impossible to adjust the leveling ring without chipping away the edge of the concrete from the outermost side of the leveling ring. At best, this makes for an unsightly appearance and necessitates grouting around the leveling ring once it is adjusted.

The principal object of this invention is to provide a junction box for an underfloor wiring distribution system wherein the vertically adjustable leveling ring may be raised after the concrete fill has hardened without disturbing the concrete.

A further object of this invention is to provide a vertically adjustable leveling ring for a junction box of the class described wherein the leveling ring is supported entirely on elevating screws so that the cover of the box will be properly supported to take the floor loading at any elevation of the leveling ring.

The junction box of the present invention is of cast iron with a bottom wall, side walls and a top wall. At least one, and as many as three, duct-receiving openings are formed in each side wall of the box. Also, as is standard practice, the corners of the box include an electrical conduit-receiving opening. The top wall is provided with a large handhole or access opening for installing the wires into the ducts and conduits and making the necessary electrical connections. A vertically adjustable leveling ring is positioned around the periphery of the access opening, and a heavy cover plate is fastened within the interior of the leveling ring to close the access opening. A plurality of elevating screws are threaded into the top wall of the box, and the head of each screw has an enlarged shoulder or skirt on which the leveling ring is supported. Small openings are formed through the leveling ring and in alignment with the heads of the elevating screws for receiving a portion thereof and making it possible to adjust the elevating screws from above. The entire perimeter of the outer side of the leveling ring is tapered inwardly from the top so that by turning the elevating screws, the leveling ring may be freed from the concrete fill and raised to the proper height to be flush with the concrete.

My invention will be better understood from the following description taken in connection with the accompanying drawings and its scope will be pointed out in the appended claims.

Figure 2 is a cross-sectional elevational view taken on the line 2—2 of Figure 1 showing the leveling ring positioned on the upstanding flange on the top wall of the box and the concrete fill in place.

Figure 3 is a cross-sectional elevational view taken on the line 3—3 of Figure 1 showing the leveling ring supported on one of the elevating screws and an adjacent locking screw loosely threaded in place.

Figure 4 is a cross-sectional view similar to that of Figure 2 with the addition of an elevating ring sandwiched between the top of the junction box and the leveling ring to accommodate a deeper concrete fill.

Figure 1:
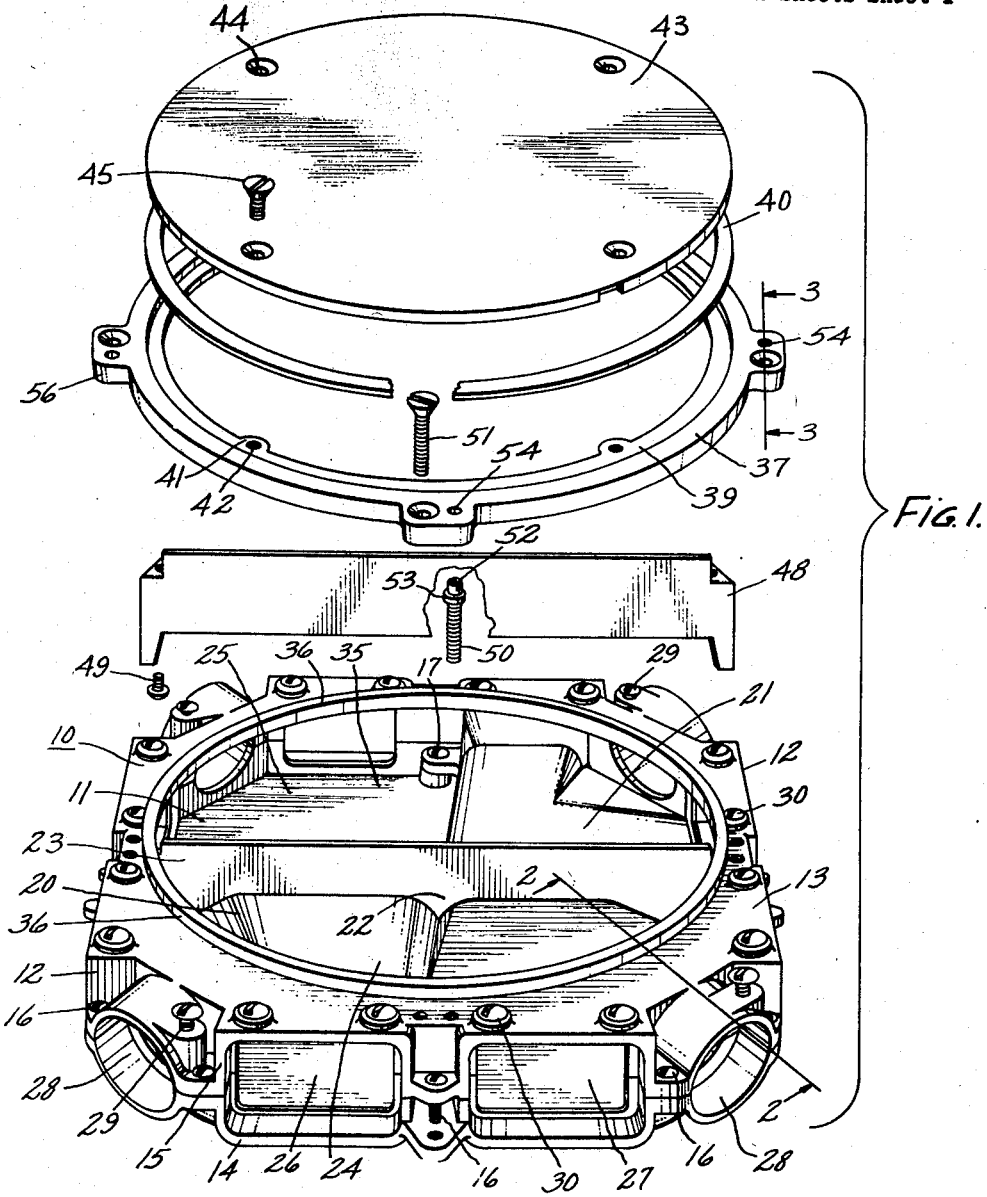
Figure 1 is an exploded view of a double duct junction box embodying my invention.

Referring in detail to the drawing and in particular to Figure 1, there is shown a double duct junction box 10 of generally square shape in plan view with a bottom wall 11, four side walls 12 and a top wall 13. This junction box 10 is a heavy two piece iron casting which is split into two halves, i.e. a bottom half 14 and a top half 15. The two castings 14 and 15 are held together by suitable screws 16 positioned around the outside of the box.

The particular box shown in the accompanying drawings has a double interior whereby the box is divided into two compartments although this feature is immaterial to the practice of the present invention. Looking at Figure 1, two tunnels 20 and 21 are shown. Tunnel 20 is located in the lower left-hand corner of the figure and tunnel 21 is in the opposite right-hand corner. These two tunnels are joined together as a single casting at the very center of the box identified by the numeral 22. A transverse barrier 23 is also integrally formed as part of the tunnels across the tops of the inner openings thereof to separate the box into the foreground compartment 24 and the background compartment 25. The tunnel structure is held to the bottom wall 11 of the box by suitable screws such as screw 17.

Each side wall 12 has two duct-receiving openings 26 and 27 while the four corners of the box are each formed with a conduit-receiving opening 28. Each conduit opening 28 has a bonding screw 29 that extends through the top wall of the box, while each duct-receiving opening 26 and 27 has two bonding screws 30, the heads of which may be seen on the top wall 13 of the box. These bonding screws 29 and 30 have two functions, first, to act as a set screw for making a mechanical connection between the box and the raceways, and second, to form an electrical bond between the box and the raceways to establish a completely grounded system.

The box structure described above is more or less conventional in this art. It has been explained in such detail merely to give a clear understanding of the surroundings in which the present invention may be used to advantage. The top wall 13 of the box is provided with a large handhole or access opening 35 that is circular in shape and nearly as large as the entire top of the box 10. The periphery of the opening 35 is defined by an upstanding flange 36. A vertically adjustable leveling ring 37 is assembled over the flange 36 in a manner as is best seen in Figure 2. The underside of the leveling ring 37 has a continuous notch 38 in which the upper portion of the flange 36 is seated. The outer side of the ring has an increased depth to reinforce the ring so that it may carry heavy floor loadings.

The inner side of the leveling ring 37 has a continuous shelf or ledge 39 for supporting an annular rubber gasket 40. The shelf 39 has several inner extensions or lugs 41, each with a threaded opening 42, so that once the rubber gasket 40 is in place, a flat cover plate 43 may be seated on the gasket 40 to lie flush with the top surface of the leveling ring 37. Suitable countersunk openings 44 are in the cover plate 43 so that fastening screws 45 may extend through the cover and be threaded into the openings 42 of the leveling ring 37. Since the leveling ring 37 is vertically adjustable, as will be better understood hereinafter, a barrier 48, shown in Figure 1, is fastened by means of screws 49 to the underside of the leveling ring 37. As the leveling ring is being assembled over the flange 36 of the box, the barrier 48 will slide down alongside the barrier 23 of the tunnel structure. It will be understood that the combined barriers 23 and 48 make it impossible to cross-connect the wires from both compartments 24 and 25.

Turning now to a consideration of Figure 3, there is shown a vertical cross-sectional view of the top casting 15 of the box with its top wall 13 and upstanding flange 36 that borders the access opening. There are two screws shown, namely, the elevating screw 50 and the locking screw 51. Both screws are threaded into suitable openings in the top casting 15, there being a similar pair of such screws at each of the four sides of the box. The elevating screw 50 is of special design whereby it is both adjustable and capable of supporting the floor loading carried by the top cover plate 43 through the leveling ring 37. The elevating screw 50 has a slotted head 52 with an enlarged shoulder or skirt 53 adjacent the lower portion of the head. It is this shoulder or skirt 53 which carries the full load of the leveling ring 37. A small ear the outer side of the leveling ring has an opening 54 that is provided for each elevating screw 50 to receive the head 52 of the screw so that the screw may be adjusted from above without disturbing the cover plate. The locking screw 51 is a standard flat head machine screw which is tightened down once the proper elevation of the leveling ring 37 is obtained. The locking screws 51 serve to hold down the leveling ring onto the supporting elevating screws 50.

Again considering Figures 1 and 2, it should be noted that the entire perimeter of the outer side of the leveling ring is tapered inwardly from the top as indicated by numeral 56. This taper is continuous around the entire ring 37 and is at an angle of approximately 6° with a vertical line. This continuous taper 56 is of primary importance in the practice of this invention because it makes it possible to raise the leveling ring 37 after the concrete fill 57 is poured and becomes hardened. In the event that too much concrete were poured, the leveling ring 37 and cover 43 would be below the level of the concrete, and considered unacceptable. This difficulty can be remedied in the junction box of the present invention by turning the elevating screws 50 to raise the leveling ring 37 to be flush with the concrete. Innumerable field trials have substantiated the fact that the concrete fill does not bind the elevating ring 37 and prevent the ring from being raised. Consequently, it is unnecessary to cutback the concrete and free the leveling ring as in prior art constructions. Also, since the concrete need not be chipped away, it is apparent that there would be no necessity for regrouting around the leveling ring after it is adjusted.

Figure 4 is a view similar to that of Figure 2 except an elevating ring 60 has been interposed around the flange 36 of the box and under the leveling ring 37 to enable the junction box 10 to be buried in a deeper concrete fill 61. These elevating rings 60 come in various sizes because it is standard practice in this art to use a range of depth of concrete fill over the ducts between a minimum of ¾" and a maximum of 2⅓". Depending on the thickness of the floor construction of the building, the elevating ring 60 may or may not be used.

Having described above my invention of a unique junction box for an underfloor wiring distribution system, it will be readily apparent to those skilled in this art that I have solved a long-felt need for a vertically adjustable leveling ring which is not bound tight by the concrete fill. This has been accomplished along with the addition of a novel elevating and supporting means for the leveling ring so that the entire floor surface loading is carried by the elevating means.

Modification of this invention will occur to those skilled in this art and it is to be understood, therefore, that this invention is not limited to the particular embodiments disclosed but that it is intended to cover all modifications within the true spirit and scope of this invention.

What I claim as new and desire to secure by Letters Patent of the United States is:

1. A junction box for an underfloor wiring distribution system comprising in combination a metal box having a bottom wall, side walls and a top wall, there being at least one duct-receiving opening in each side wall, the top wall having a circular access opening provided with an upstanding flange around its periphery, a vertically adjustable leveling ring positioned over the flange of the box, and a cover plate fastened within the leveling ring thereby closing the access opening in the top wall of the box, the outer side of the ring being of increased depth for reinforcing the ring to carry heavy floor loadings, elevating screws threaded into the top wall of the box outside the said flange and cover plate, the head of each screw having an enlarged shoulder on which the leveling ring is supported, a small opening through the leveling ring for each elevating screw so that it may be adjusted from above, each opening being disposed in an ear extending from the outer side of the ring, the entire perimeter of the outer side of the leveling ring being tapered inwardly from the top so that the leveling ring may be raised by the elevating screws after the box is buried in concrete fill that has hardened without disturbing the cover plate or cutting back the concrete to free the leveling ring.

2. In an underfloor wiring distribution system, in combination, a metal box having a bottom wall, side walls and a top wall, there being at least one duct-receiving opening in each side wall, the top wall having an access opening provided with an upstanding flange around its periphery, a vertically adjustable leveling ring having a continuous notch in its bottom side that fits over the top of the said upstanding flange, the outer side of the ring being of increased depth for reinforcing the ring to carry heavy floor loadings, and a cover plate fastened within the leveling ring to close the access opening, elevating screws threaded into the top wall of the box on the outside of the said flange and cover plate, the head of each screw having an enlarged skirt on which the leveling ring is supported, a small opening extending through the leveling ring for receiving the head of each elevating screw so that the screw may be adjusted from above without disturbing the cover plate, the entire perimeter of the outer side of the leveling ring being tapered inwardly from the top so that when the junction box is buried in concrete fill the elevating screws may be turned to raise the leveling ring without interference from the concrete.

(References on following page)

References Cited in the file of this patent

UNITED STATES PATENTS

| | | |
|---|---|---|
| 699,381 | Fullman | May 6, 1902 |
| 740,663 | Krantz | Oct. 6, 1903 |
| 1,533,759 | Richardson et al. | Apr. 14, 1925 |
| 1,550,870 | Braden | Aug. 25, 1925 |
| 1,626,570 | Walker | Apr. 26, 1927 |
| 2,043,648 | Bissell et al. | June 9, 1936 |
| 2,063,569 | Walker | Dec. 8, 1936 |
| 2,287,661 | Bone et al. | June 23, 1942 |